(12) United States Patent
Shirai (10) Patent No.: US 8,596,663 B2
(45) Date of Patent: Dec. 3, 2013

(54) FLUID FLOW CONTROL STRUCTURE

(75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 218 days.

(21) Appl. No.: 13/074,120

(22) Filed: Mar. 29, 2011

(65) Prior Publication Data
US 2012/0247894 A1 Oct. 4, 2012

(51) Int. Cl.
*B62K 1/00* (2006.01)

(52) U.S. Cl.
USPC .......................................... 280/276; 188/275

(58) Field of Classification Search
USPC .......... 188/266.3, 266.5, 282.5, 282.6, 319.1, 188/322.15; 280/275, 276
See application file for complete search history.

(56) References Cited

U.S. PATENT DOCUMENTS

| | | | | |
|---|---|---|---|---|
| 3,625,320 | A * | 12/1971 | Doetsch et al. | 188/269 |
| 3,647,239 | A * | 3/1972 | Katsumori | 280/124.154 |
| 3,658,313 | A * | 4/1972 | Hahn | 267/64.17 |
| 6,332,622 | B1 * | 12/2001 | Nakamura et al. | 280/124.159 |
| 6,860,370 | B2 * | 3/2005 | Nakadate | 188/282.5 |
| 6,915,885 | B2 * | 7/2005 | Forster | 188/266.3 |
| 7,083,180 | B2 | 8/2006 | Turner | |
| 7,163,222 | B2 | 1/2007 | Becker et al. | |
| 2007/0090624 | A1 * | 4/2007 | Chen | 280/276 |
| 2011/0067965 | A1 * | 3/2011 | McAndrews | 188/275 |
| 2011/0083930 | A1 * | 4/2011 | Laird et al. | 188/275 |
| 2011/0257848 | A1 * | 10/2011 | Shirai | 701/49 |

FOREIGN PATENT DOCUMENTS

TW  375149 U  3/2010

OTHER PUBLICATIONS

Taiwanese Office Action for ROC(Taiwan) Patent Application No, 100128237 Issued on Aug. 23, 2013.

* cited by examiner

*Primary Examiner* — Christopher Schwartz
(74) *Attorney, Agent, or Firm* — Global IP Counselors, LLP (57) ABSTRACT

A fluid flow control structure for a bicycle device is basically provided with a main body, at least one port and a plug. The main body has a first chamber, a second chamber and a third chamber. The at least one port is in fluid communication with the first chamber. The plug is moved toward a first axial direction to close the port, and is moved toward a second axial direction that is opposite the first axial direction to open the port. The plug includes a dividing portion dividing the second chamber and the third chamber such that the third chamber widens as the plug moves to close the port and the third chamber shrinks as the plug moves to open the port. The plug includes a passage fluidly connecting the first chamber to the third chamber.

13 Claims, 8 Drawing Sheets

FLUID FLOW CONTROL STRUCTURE

BACKGROUND

1. Field of the Invention

This invention generally relates to a fluid flow control structure. More specifically, the present invention relates to a fluid flow control structure for bicycle devices or components such as seatpost assemblies, suspensions and other components that utilize a fluid in their operation.

2. Background Information

Various bicycle devices or components utilize a fluid in their operation such as seatpost assemblies and suspensions. For example, a bicycle seat is normally supported on a bicycle frame by a seatpost that is telescopically disposed in the seat tube of the bicycle frame. In some case, the seatpost is provided with a height adjustment and or a shock absorbing function. Recently, seatpost assemblies have been proposed that are hydraulically operated in order to adjust the height of the seat. One example of a hydraulically operated seatpost assembly is disclosed in U.S. Pat. No. 7,083,180 that is adjustable in height. Also suspensions also often adjustable in height. One example of a bicycle suspension that has a suspension stroke (height) adjustment and a suspension lockout is disclosed in U.S. Pat. No. 7,163,222.

SUMMARY

One aspect is to provide a fluid flow control structure in which a plug can be easily moved from an open position to a close position for closing a port of a fluid chamber.

In view of the state of the known technology, a fluid flow control structure for a bicycle device is provided that basically comprises a main body, at least one port and a plug. The main body has a first chamber, a second chamber and a third chamber. The at least one port is in fluid communication with the first chamber. The plug is moved toward a first axial direction to close the port, and is moved toward a second axial direction that is opposite the first axial direction to open the port. The plug includes a dividing portion dividing the second chamber and the third chamber such that the third chamber widens as the plug moves to close the port and the third chamber shrinks as the plug moves to open the port. The plug includes a passage fluidly connecting the first chamber to the third chamber.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 4, a bicycle seatpost assembly 12 is illustrated with a in accordance with a first embodiment. The bicycle seatpost assembly 12 is mounted to a seat tube (not shown) of a bicycle frame (not shown). The bicycle seatpost assembly 12 adjusts a seat height of a bicycle saddle (not shown) with respect to the bicycle frame (not shown). The seat tube (not shown) is also provided with a conventional clamp (not shown) provided on the upper end of the seat tube (not shown). Basically, the bicycle seatpost assembly 12 includes a telescoping seatpost 22 and a motor unit 24.

The motor unit 24 is electrically coupled to both an operating device (not shown) and a battery (not shown). The motor unit 24 is operatively coupled to the telescoping seat post 22, and is disposed within the seat tube 14 when the telescoping seatpost 22 is in the installed position. By using the operating device (not shown), the rider easily can control the operation of the motor unit 24 for adjusting the height of the telescoping seatpost 22. In this embodiment, the length of the telescoping seatpost 22 is infinitely adjustable between a high seatpost position and a low seatpost position. With the bicycle seatpost assembly 12, the rider can easily change the seatpost position of the bicycle saddle 18 while riding the bicycle 10, i.e., without stopping.

Referring now to FIGS. 1 to 4, the telescoping seatpost 22 is a separate unit from the bicycle frame (not shown) such that it can be easily installed into the seat tube (not shown) in place of a conventional non-adjustable seatpost. Basically, the telescoping seatpost 22 includes an inner tube 30, an outer tube 32 and a seat mounting member 34. The inner tube 30 has a first (upper) end 30a and a second (lower) end 30b. The outer tube 32 has a first (upper) end 32a and a second (lower) end 32b. The outer tube 32 is telescopically connected to the inner tube 30, with the amount of insertion of the inner tube 30 into the outer tube 32 being adjustable. In particular, the second (lower) end 30b of the inner tube 30 is slidably disposed in the first (upper) end 32a of the outer tube 32. Thus, the inner and outer tubes 30 and 32 constitute first and second telescopic tubes that form a main body having a plurality of fluid chambers as discussed below.

Figure 7:
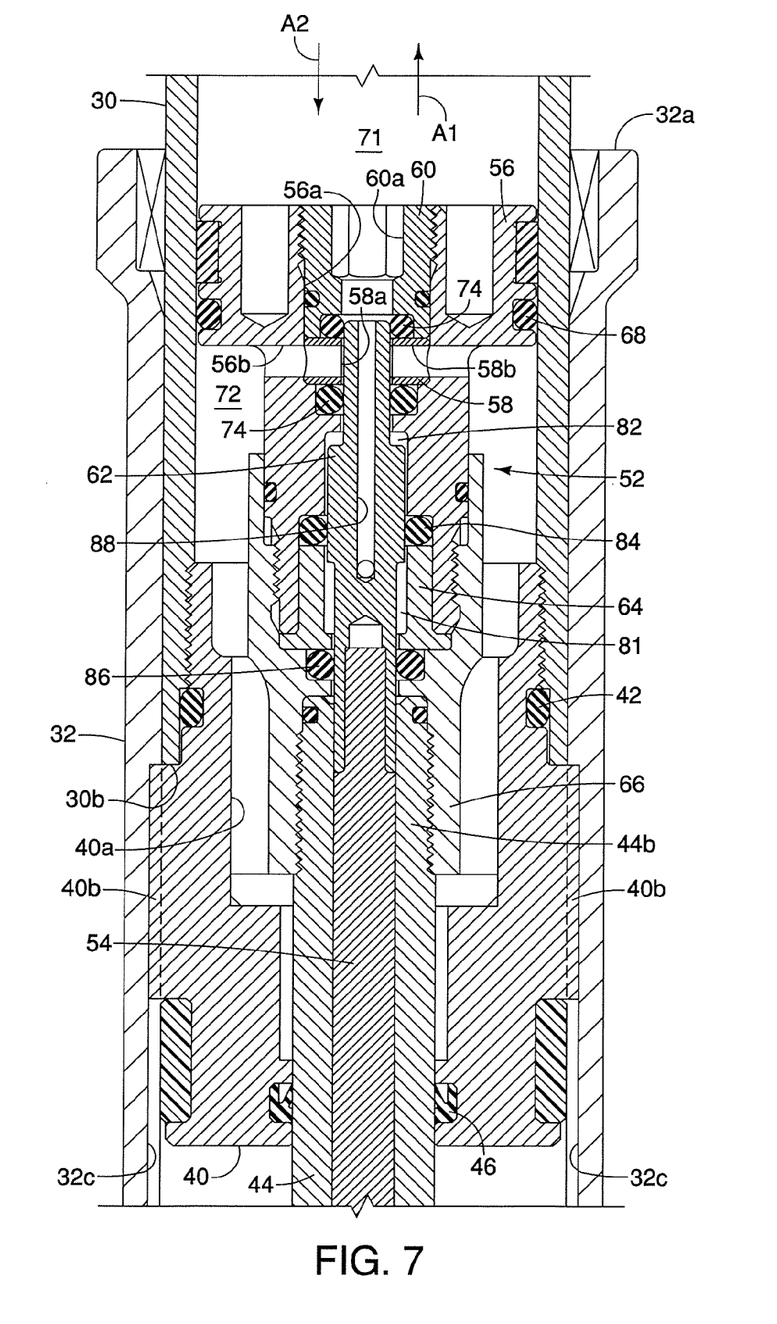
FIG. 7 is an enlarged, longitudinal cross sectional view of a middle portion of the bicycle seatpost assembly illustrated in FIGS. 1 to 4, with the plug moved to the closed position for locking the bicycle seatpost assembly at a desired height.

As seen in FIG. 7, the seat mounting member 34 is fixed (threaded) to the first end 30a of the inner tube 30 for mounting the bicycle saddle 18 to the telescoping seatpost 22 in a conventional manner. Thus, the seat mounting member 34 forms a saddle attachment portion of the first end 30a of the inner tube 30 for attaching the bicycle saddle (not shown). The seat mounting member 34 includes an air filler valve port 35 for receiving pressurized air or other gaseous fluid. The air filler valve port 35 includes an air filler valve 35a, which is a one-way valve for filling the upper end of the inner tube 30 with compressed air or other compressed gas. The seat mounting member 34 seals off the first end 30a of the inner tube 30. The inner tube 30 also has a floating piston 36 slidably mounted within the interior bore of the inner tube 30 to move in an axial direction of the inner tube 30. Thus, a fluid chamber 38 is formed between the floating piston 36 and the first end 30a of the inner tube 30. The gas in the chamber 38 acts the limiter regarding the downward movement of the inner tube 30 within the outer tube 32.

Figure 1:
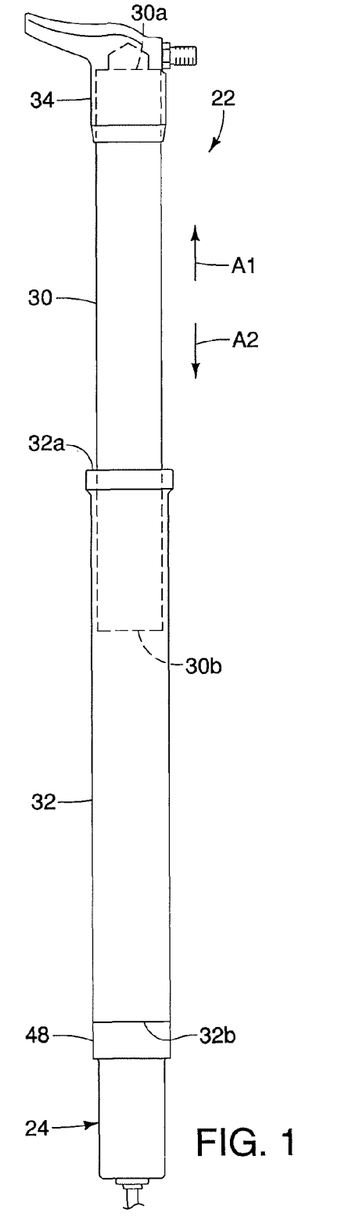
FIG. 1 is a side elevational view of a bicycle seatpost assembly that includes a fluid flow control structure in accordance with one illustrated embodiment with the bicycle seatpost assembly in the high or top seatpost position.
Figure 2:
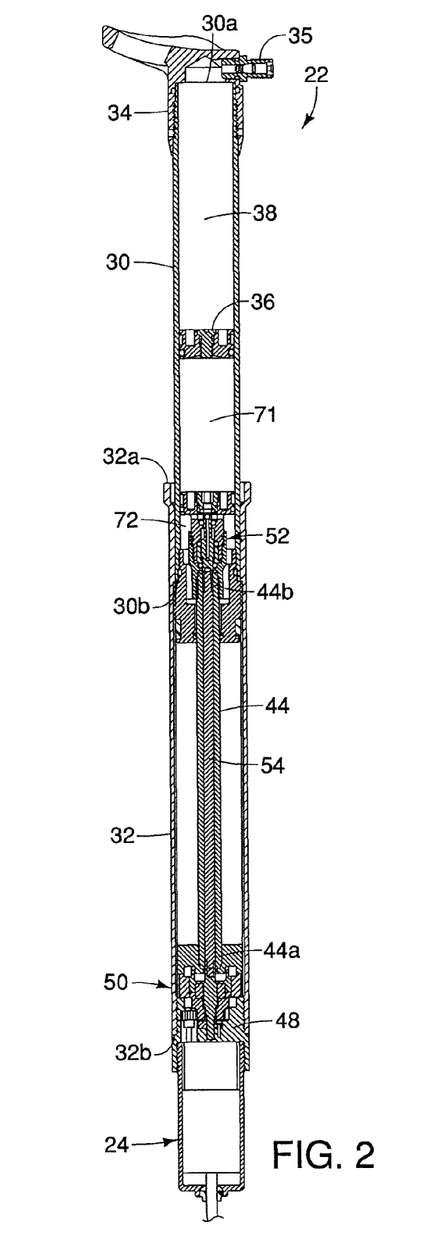
FIG. 2 is a longitudinal cross sectional view of the bicycle seatpost assembly illustrated in FIG. 1 with the gear reduction unit and the motor shown in elevation.
Figure 3:
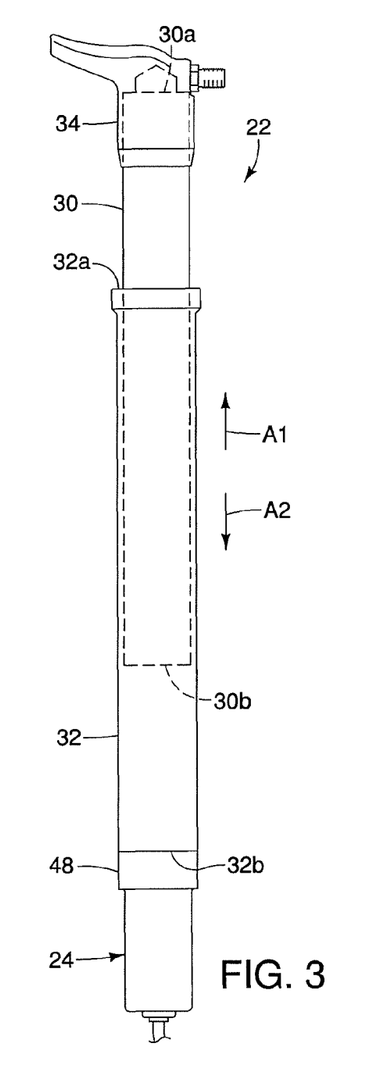
FIG. 3 is a side elevational view of the bicycle seatpost assembly illustrated in FIGS. 1 and 2, but with the bicycle seatpost assembly in a lowered seatpost position.
Figure 4:
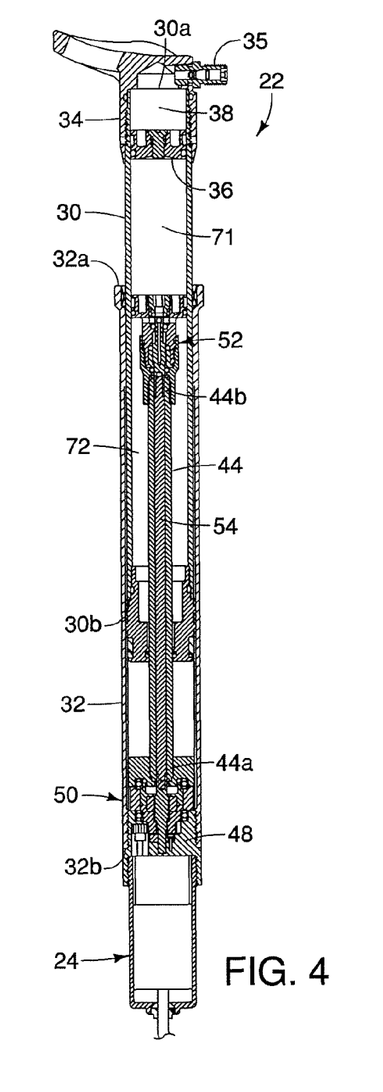
FIG. 4 is a longitudinal cross sectional view of the bicycle seatpost assembly illustrated in FIG. 3 with the gear reduction unit and the motor shown in elevation.
Figure 5:
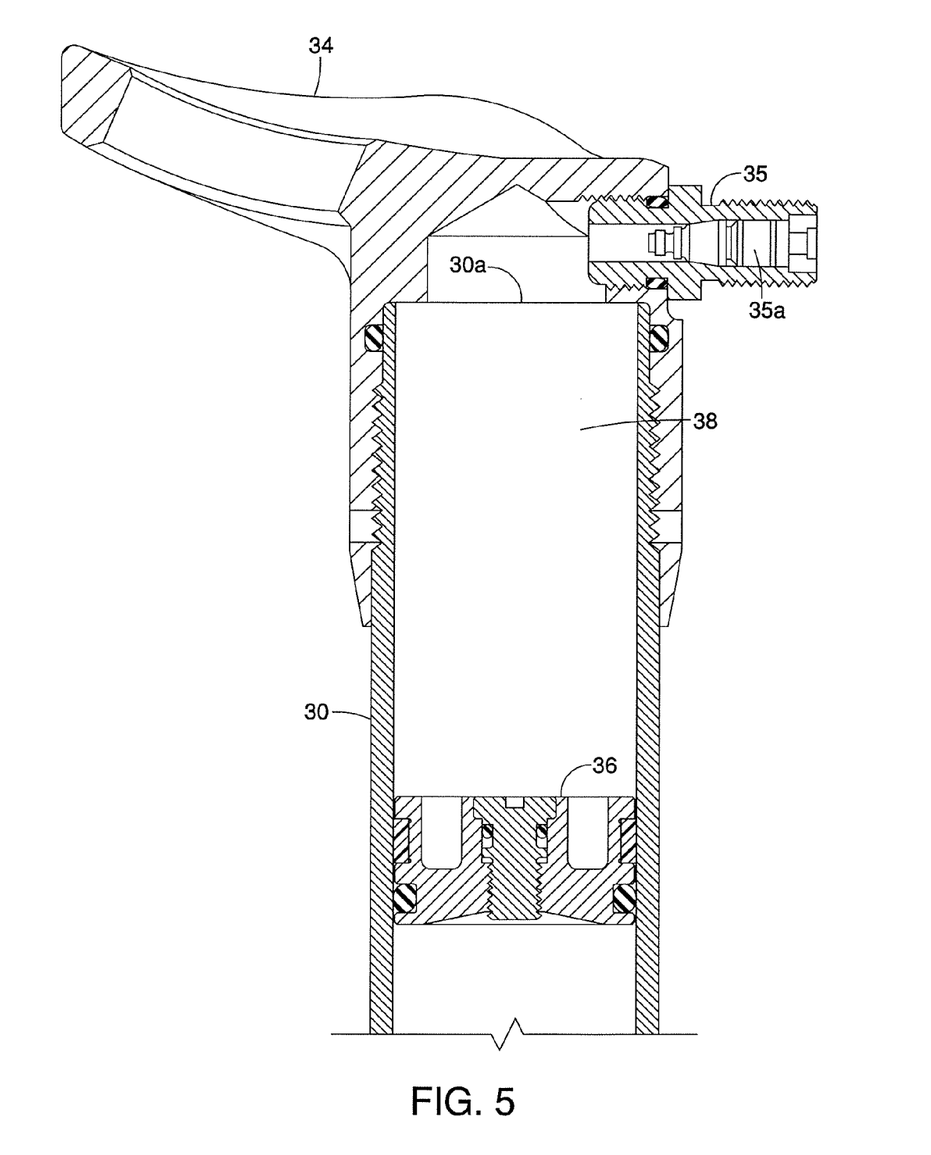
FIG. 5 is an enlarged, longitudinal cross sectional view of a top portion of the bicycle seatpost assembly illustrated in FIGS. 1 to 4.

As seen in FIGS. 2 and 4, the axial position of the floating piston 36 changes as the seatpost position of the telescoping seatpost 22 changes. Specifically, the axial position of the floating piston 36 moves to its lowermost position when the telescoping seatpost 22 is in the high seatpost position as seen in FIG. 2. The axial position of the floating piston 36 moves upward as the inner tube 30 moves into the outer tube 32 as seen in FIG. 4. Thus, the air or gas in the fluid chamber 38 becomes more compressed as the seatpost position of the telescoping seatpost 22 becomes lower with respect to the preceding seatpost position. The compressed air or gas in the fluid chamber 38 provides a driving force for extending the inner tube 30 with respect to the outer tube 32 when the seatpost position of the telescoping seatpost 22 is changed from a lower position to a higher position.

Figure 8:
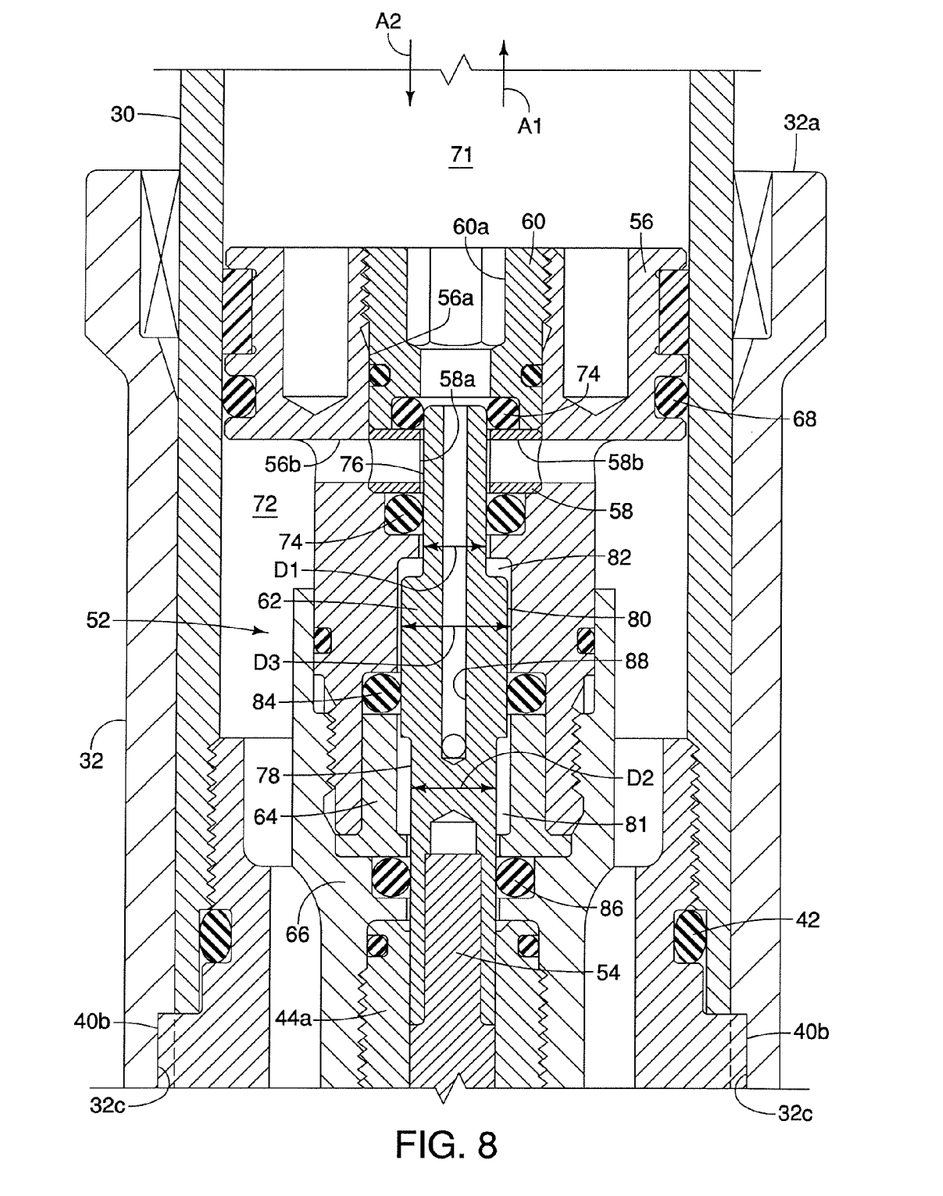
FIG. 8 is a further enlarged, longitudinal cross sectional view of a middle portion of the bicycle seatpost assembly illustrated in FIGS. 1 to 4, with the plug moved to the closed position for locking the bicycle seatpost assembly at a desired height.

As seen in FIG. 8, the second end 30b of the inner tube 30 has a guide block 40 that is fixed (threaded) thereto. The guide block 40 has a center bore 40a and a plurality of keys 40b for engaging a plurality of longitudinal slots 32c of the outer tube 32 to prevent rotation between the inner and outer tubes 30 and 32, as explained below. The guide block 40 seals off the second end 30b of the inner tube 30. In particular, the interface between the interior surface of the second end 30b of the inner tube 30 and the outer periphery of the guide block 40 is sealed by an O-ring or annular sealing member 42, while the interface between the center bore 40a and an outer periphery of a guide member 44 is sealed by an O-ring or annular sealing member 46. In this way, the guide block 40 is slidably supported on the guide member 44 in an air tight manner. Thus, the guide block 40 acts as a bottom plug of the second end 30a of the inner tube 30.

Figure 6:
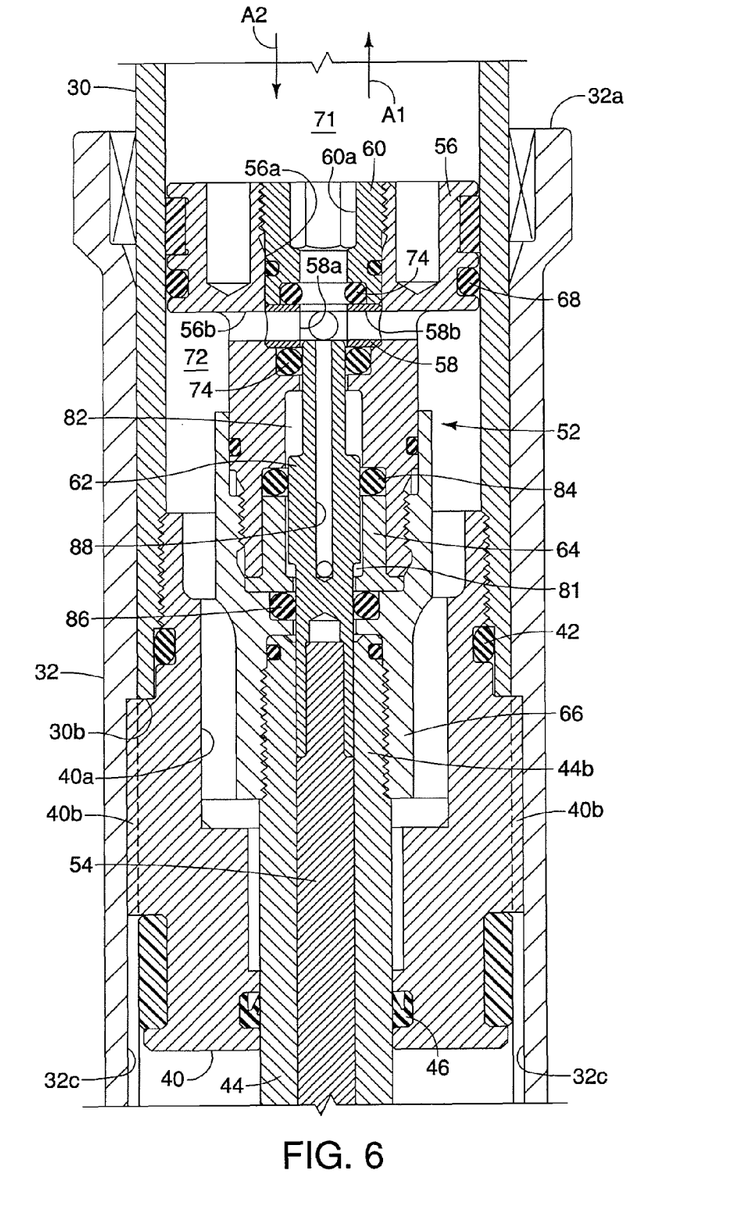
FIG. 6 is an enlarged, longitudinal cross sectional view of a middle portion of the bicycle seatpost assembly illustrated in FIGS. 1 to 4, with the plug moved to the open position for adjusting the height of the bicycle seatpost assembly.

As seen in FIGS. 6 and 7, the first end 32a of the outer tube 32 receives the second end 30b of the inner tube 30. Also, as mentioned above, the interior surface of the outer tube 32 is provided with the longitudinal slots 32c that receives the keys 40b of the guide block 40 for preventing relative rotation between the inner and outer tubes 30 and 32. The longitudinal slots 32c are preferably equally spaced apart in the circumferential direction of the interior surface of the outer tube 32. The number of the longitudinal slots 32c corresponds to the number of the keys 40b. The longitudinal slots 32c extend from the opening of the second end 32b of the outer tube 32 (FIG. 9) to a predetermined location that is spaced from the opening of the first end 32a of the outer tube 32. Thus, the longitudinal slots 32c form abutments that limit upward movement of the inner tube 30 from the outer tube 32. In view of this configuration, the inner tube 30 is installed in the outer tube 32 by inserting the first end 30a of the inner tube 30 into the second end 32b of the outer tube 32, and then attaching the seat mounting member 34 to the first end 30a of the inner tube 30 after the inner tube 30 is installed in the outer tube 32.

Figure 9:
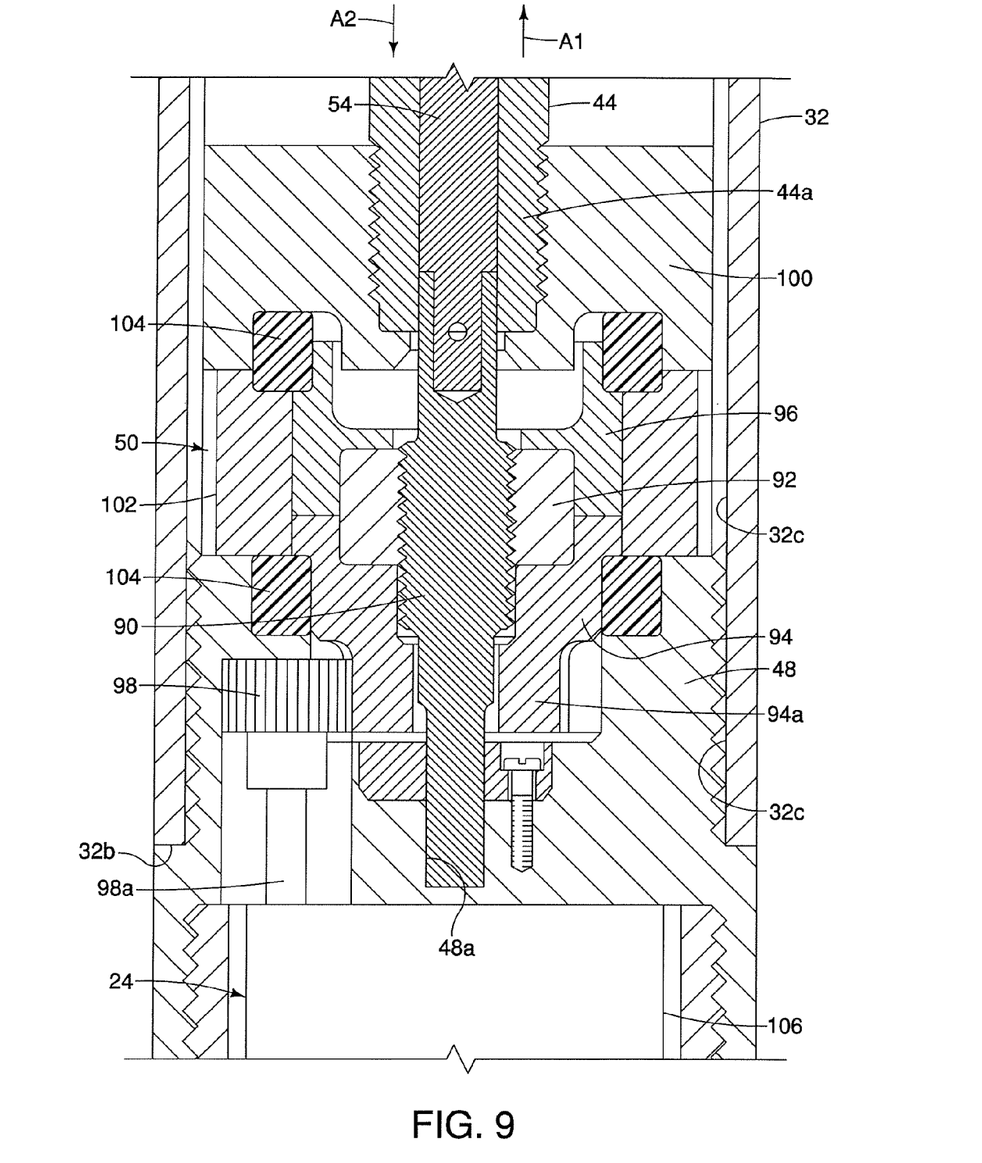
FIG. 9 is an enlarged, longitudinal cross sectional view of a lower portion of the bicycle seatpost assembly illustrated in FIGS. 1 to 4.

Referring to FIGS. 2, 4 and 9, the second end 32b of the outer tube 32 has a bottom support block 48 that is fixed (threaded) thereto. The bottom support block 48 supports a drive unit 50 within the interior space of the second end 32b of the outer tube 32. The drive unit 50 supports a lower end 44a of the guide member 44 such that the guide member 44 is stationary with respect to the outer tube 32. In the illustrated embodiment, the lower end 44a of the guide member 44 is threadedly attached to the drive unit 50 as explained below. The guide member 44 has an upper end 44b with a valve unit 52 that is fixed (threaded) thereto. Thus, the valve unit 52 is stationary with respect to the outer tube 32 and slidably engages the inner tube 30. A control rod 54 is disposed inside of the guide member 44. The motor unit 24 is attached to the bottom support block 48 outside of the outer tube 32. The motor unit 24 is operatively coupled to the control rod 54 for axially moving the control rod 54 within the guide member 44.

Referring to FIGS. 6 to 8, the valve unit 52 will now be discussed in more detail. The valve unit 52 is immovably disposed with respect to the outer tube 32, while the inner tube 30 slides between the outer tube 32 and the valve unit 52. The valve unit 52 basically includes a piston 56, a valve body 58, a valve retainer 60, a plug 62, a plug retainer 64 and a rod attachment fitting 66. The valve unit 52 cooperates with the motor unit 24, the inner and outer tubes 30 and 32, the floating piston 36, the guide block 40, the guide member 44, the drive unit 50 and the control rod 54 to form a fluid flow control structure. This fluid flow control structure is not limited to use in a seatpost, but rather can be used in other bicycle devices or components such as suspensions that are hydraulically adjustable and/or includes a suspension lockout feature.

The piston 56 and the valve body 58 form a blocking member that is disposed in the second end 30b of the inner tube 30. The outer periphery of the piston 56 slides along the interior surface of the inner tube 30 as the inner tube 30 moves axially within the outer tube 32. An O-ring or annular sealing member 68 seals the interface between the outer periphery of the piston 56 and the interior surface of the inner tube 30. Thus, the piston 56 and the valve body 58 form the blocking member that divides the inner tube 30 into two fluid chambers 71 and 72. The fluid chamber 71 is disposed between the blocking member (e.g., the piston 56 and the valve body 58) and the floating piston 36. The fluid chamber 72 is disposed between the blocking member (e.g., the piston 56 and the valve body 58) and the guide block 40 that is attached to the second end 30b of the inner tube 30. The volumes of the fluid chambers 71 and 72 vary depending the insertion amount of the inner tube 30 within the outer tube 32, and thus, overall the height of the telescoping seatpost 22. As explained below, the valve body 58 cooperates with the plug 62 to control the flow of fluid between the fluid chambers 71 and 72 to change the height of the telescoping seatpost 22. In the illustrated embodiment, the fluid chambers 71 and 72 contain a relatively incompressible liquid (e.g., oil or hydraulic fluid).

Still referring to FIGS. 6 to 8, the piston 56 has a longitudinally extending center bore 56a with its interior width varying to accommodate the valve body 58, the valve retainer 60, the plug 62 and the plug retainer 64 therein. The piston 56 also has a plurality of radially extending bores 56b. These bores 56b are in fluid communication with the extending the center bore 56a such the fluid can flow from the fluid chamber 71 to the fluid chamber 72 via the bores 56a and 56b.

The valve body 58 is positioned within the center bore 56a so as to form a valve seat for the plug 62. In particular, the valve body 58 has a center port 58a that is aligned with the center bore 56a of the piston 56 and several radially extending ports 58b that are aligned with the bores 56b of the piston 56. An O-ring or annular sealing member 74 is provided on each axial face of the valve body 58 for creating a seal on each side the valve body 58. The valve retainer 60 is threaded into the center bore 56a of the piston 56 for retaining the valve body 58 in the center bore 56a of the piston 56. The valve retainer 60 installed so as to slightly compresses the O-rings 74 for creating good seals. The valve retainer 60 also has a longitudinally extending center bore 60a that is aligned with the center port 58a of the valve body 58.

The plug 62 is disposed in the center bore 56a of the piston 56 for selectively closing and opening the center port 58a of the valve body 58. In other words, the plug 62 and the valve body 58 cooperate together to selectively control the flow of fluid between the fluid chambers 71 and 72. Opening and closing the center port 58a of the valve body 58 is accomplished by axial movement of the plug 62 within the center bore 56a of the piston 56. The plug 62 is moved toward a first axial direction A1 (i.e., upward in the illustrated embodiment) to close the center port 58a of the valve body 58. The plug 62 is moved toward a second axial direction A2 (i.e., downward in the illustrated embodiment) that is opposite the first axial direction to open the center port 58a of the valve body 58. In particular, the plug 62 is moved axially with in the center bore 56a of the piston 56 in response to operation of the motor unit 24, which moves the control rod 54 axially within the guide member 44 as explained below.

Referring to FIG. 8, the plug 62 basically includes a first axial side portion 76, a second axial side portion 78 and a dividing portion 80. In the illustrated embodiment, the portion 76, 78 and 80 are integrally formed as a one-piece, unitary member. However, the portion 76, 78 and 80 can be separate members that are fixed together as needed and/or desired. The portion 76, 78 and 80 are linearly arranged in the first and second axial directions A1 and A2. The first axial side portion 76 is coupled to the dividing portion 80 on the first axial direction side of the dividing portion 80. The first axial side portion 76 extends in the first axial direction A1 from the dividing portion 80 for selectively closing and opening the center port 58a of the valve body 58. The second axial side portion 78 is coupled to the dividing portion 80 on the second axial direction side of the dividing portion 80. The second axial side portion 78 extends in the second axial direction A2 from the dividing portion 80 for attachment to an upper end of the control rod 54.

The dividing portion 80 divides a section of the center bore 56a of the piston 56 into two fluid chambers 81 and 82. An O-ring or annular sealing member 84 is disposed in the center bore 56a of the piston 56 between the interior surface of the center bore 56a of the piston 56 and the outer peripheral surface of the dividing portion 80 to seal the interface therebetween.

The plug retainer 64 is disposed in the lower opening of the center bore 56a of the piston 56 for retaining the plug 62 and holding the O-ring 84 within the center bore 56a of the piston 56. The plug retainer 64 is held in place by the rod attachment fitting 66 which is threaded onto the lower end of the piston 56. An O-ring or annular sealing member 86 is disposed around the second axial side portion 78 and axially between the plug retainer 64 and the rod attachment fitting 66. With this arrangement, the plug 62 is axially movable within a predetermined range of axial movement between an internal abutment of the center bore 56a of the piston 56 and the plug retainer 64.

A passage 88 fluidly connects the fluid chamber 81 to the fluid chamber 71 while the plug 62 is in a position that closes the center port 58a of the valve body 58. The passage 88 also fluidly connects the fluid chamber 81 to both the fluid chambers 71 and 72 while the plug 62 is in a position that opens the center port 58a of the valve body 58. As seen in FIG. 8, the fluid chamber 81 shrinks as the plug 62 moves to open the center port 58a of the valve body 58, while the fluid chamber 82 widens as the plug 62 moves to open the center port 58a of the valve body 58. On the other hand, as seen in FIG. 9, the fluid chamber 81 widens as the plug 62 moves to close the center port 58a of the valve body 58, and the fluid chamber 82 shrinks as the plug 62 moves to close the center port 58a of the valve body 58. The fluid chamber 81 is fluid tight by the seals created by the O-rings 84 and 86. On the other hand, the fluid chamber 82 is fluid tight by the seals created by the lower one of the O-rings 74 and the O-ring 84. In the illustrated embodiment, the fluid chamber 81 contains a liquid (e.g., oil or hydraulic fluid) since the fluid chamber 81 fluidly communicates with the chamber 71, which contains a liquid (e.g., oil or hydraulic fluid). On the other hand, the fluid chamber 82 contains a compressible gas (e.g., air).

The first axial side portion 76 has a first maximum outer width D1. The axial side portion 76 has a substantially constant outer cross section shape with respect to the first and second axial directions A1 and A2. For example, the axial side portion 76 can be cylindrical, as shown, or parallelepiped. The second axial side portion 78 has a second maximum outer width D2. The second axial side portion 78 has a substantially constant outer cross section shape with respect to the first and second axial directions A1 and A2. For example, the dividing portion 80 can be cylindrical, as shown, or parallelepiped. The dividing portion 80 has a third maximum outer width D3. The dividing portion 80 has a substantially constant outer cross section shape with respect to the first and second axial directions A1 and A2. For example, the dividing portion 80 can be cylindrical, as shown, or parallelepiped.

In the illustrated embodiment, the first maximum outer width D1 is smaller than the second maximum outer width D2. The first and second maximum outer widths D1 and D2 are smaller than the third maximum outer width D3, respectively. The first, second and third maximum outer widths D1, D2 and D3 are preferably dimensioned to satisfy the following equation: $\pi(D3)^2 - \pi(D2)^2 = \pi(D1)^2$.

With this dimensional relationship, the axial force acting on the plug 62 from the fluid in the fluid chamber 71 is substantially equal to the axial force acting on the plug 62 from the fluid in the fluid chamber 81. In particular, since the passage 88 connects the fluid chamber 81 to the fluid chamber 71 while the center port 58a of the valve body 58 is closed by the plug 62, the pressure of the fluid in the fluid chamber 81 is equal to the pressure of the fluid in the fluid chamber 71. Thus, if the surface area of the plug 62, which is subjected to the axial force of the fluid in the fluid chamber 71, is equal to the surface area of the plug 62, which is subjected to the axial force of the fluid in the fluid chamber 81, then the axial forces on the opposite sides of the plug 62 will balanced.

In this illustrated embodiment, the fluid flow control structure of the telescoping seatpost 22 includes five fluid chambers located within the inner tube 30. For example, the fluid chambers 71, 81, 82, 72 and 38 can be considered first, second, third, fourth and fifth chambers, respectively. In this case, the blocking member (e.g., the piston 56 and the valve body 58) divides the inner tube 30 into the first chamber 71 and the fourth chamber 72. Also the first chamber 71 is disposed between the floating piston 36 and the blocking member (e.g., the piston 56 and the valve body 58). Furthermore, in this illustrated embodiment, the blocking member (e.g., the piston 56 and the valve body 58) includes the center port 58a that fluidly connects the first chamber 71 to the fourth chamber 72. The dividing portion 62a of the plug 62 divides a section of the center bore 56a of the piston 56 into the second and third chambers 81 and 82. The fifth chamber 38 is formed between the floating piston 36 and the first end 30a of the inner tube 30.

Referring to now FIG. 9, the drive unit 50 will now be briefly discussed. In this illustrated embodiment, the drive unit 50 is supported within the interior space of the second end 32b of the outer tube 32 by the bottom support block 48. Basically, the drive unit 50 includes a drive screw 90, a drive nut 92, a first nut housing part 94, a second nut housing part 96, an input gear 98, a support block 100 and a spacer 102. Of course, other types of drive units can be used to move the axially move the control rod 54 within the guide member 44. The drive screw 90 is non-rotatably disposed in a blind bore 48a of the bottom support block 48. The drive screw 90 is axially movable in the blind bore 48a of the bottom support block 48. The drive nut 92 is threaded on the drive screw 90 such that rotation of the drive nut 92 moves the drive screw 90 in the first and second axial directions A1 and A2. In FIG. 9, the drive screw 90 is in its lower most position, which corresponds to the plug 62 being in the open position of FIG. 6. The drive nut 92 is held in between the first and second nut housing parts 94 and 96, which are rotatably disposed between the bottom support block 48 and the support block 100 by a pair of low friction bearing rings 104. The first nut housing part 94 has a gear portion 94a. The teeth of the gear portion 94a that are engaged with the teeth of the input gear 98 such that rotation of the input gear 98 causes rotation of the drive nut 92 and the nut housing parts 94 and 96 as a unit. The input gear 98 has an input shaft 98a that is connected to the motor unit 24, which rotates the input gear 98.

Figure 10:
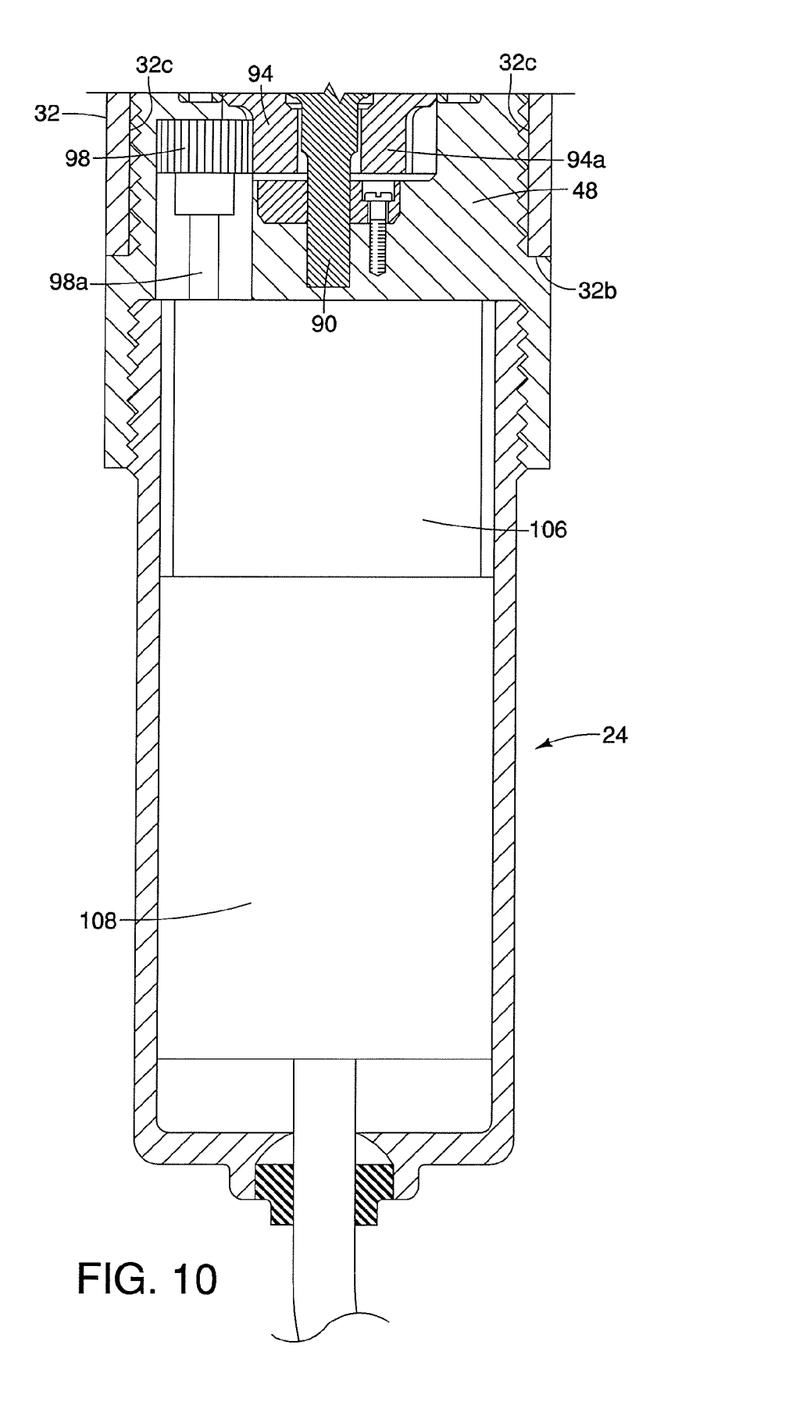
FIG. 10 is an enlarged, longitudinal cross sectional view of a bottom portion of the bicycle seatpost assembly illustrated in FIGS. 1 to 4, with the gear reduction unit and the motor shown in elevation.

Referring to now FIG. 10, the motor unit 24 includes a gear reduction mechanism 106 and a reversible electric motor 108. Basically, the motor 108 receives electrical power (electricity) from the battery 28 in response to operation of the operating device 24. When the motor 108 is energized, the motor 108 rotates the input gear 98 via the reduction mechanism 106. This rotation of the input gear 98 rotates the drive nut 92 and the nut housing parts 94 and 96 as a unit. The rotation of the drive nut 92 drives the drive screw 90 in an axial direction, which in turn pushes or pulls the control rod 54 and the plug 62 for closing and opening the center port 58a of the valve body 58. Thus, the motor unit 24 and the drive unit 50 constitute an actuating device that mounted to the outer tube 32 and that is operatively coupled to the plug 62 to selectively move the plug 62 for closing and opening the center port 58a of the valve body 58.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fluid flow control structure for a bicycle device comprising:
   a main body having a first chamber containing a liquid, a second chamber containing a gas and a third chamber containing a liquid, the second chamber and the third chamber being fluid tight with respect to each other;
   at least one port in fluid communication with the first chamber; and
   a plug being moved toward a first axial direction to close the port and being moved toward a second axial direction that is opposite the first axial direction to open the port, the plug including a dividing portion dividing the second chamber and the third chamber such that the third chamber expands as the plug moves to close the port and the third chamber shrinks as the plug moves to open the port, and a passage fluidly connecting the first chamber to the third chamber.

2. The fluid flow control structure according to claim 1, wherein
   the plug further includes a first axial side portion coupled to the dividing portion on a first axial direction side of the dividing portion for selectively closing and opening the port, and a second axial side portion coupled to the dividing portion on a second axial direction side of the dividing portion.

3. The fluid flow control structure according to claim 2, wherein
   the first axial side portion, the second axial side portion and the dividing portion have substantially constant outer cross section shape with respect to the first and second axial directions, the first axial side portion, the second axial side portion and the dividing portion are linearly arranged in the first and second axial directions.

4. The fluid flow control structure according to claim 3, wherein
   the first axial side portion has a first maximum outer width, the second axial side portion has a second maximum outer width, and the dividing portion has a third maximum outer width, the first maximum outer width and the second maximum outer width are smaller than the third maximum outer width, respectively, the first maximum outer width is smaller than the second maximum outer width.

5. The fluid flow control structure according to claim 1, wherein
the main body includes a first tube having the first chamber, the second chamber and the third chamber located within the first tube.

6. A fluid flow control structure for a bicycle device comprising:
a main body having a first chamber, a second chamber and a third chamber;
at least one port in fluid communication with the first chamber; and
a plug being moved toward a first axial direction to close the port and being moved toward a second axial direction that is opposite the first axial direction to open the port,
the plug including a first axial side portion, a second axial side portion, a dividing portion and a passage,
the first axial side portion having a first maximum outer width and being coupled to the dividing portion on a first axial direction side of the dividing portion for selectively closing and opening the port,
the second axial side portion having a second maximum outer width larger than the first maximum outer width and being coupled to the dividing portion on a second axial direction side of the dividing portion, and
the dividing portion having a third maximum outer width larger than the second maximum outer width and dividing the second chamber and the third chamber such that the third chamber expands as the plug moves to close the port and the third chamber shrinks as the plug moves to open the port,
the passage fluidly connecting the first chamber to the third chamber,
the first axial side portion, the second axial side portion and the dividing portion having substantially constant outer cross section shapes with respect to the first and second axial directions, and the first axial side portion, the second axial side portion and the dividing portion being linearly arranged in the first and second axial directions,
the first maximum outer width of the first axial side portion, the second maximum outer width of the second axial side portion, and the third maximum outer width of the dividing portion being dimensioned such that $\pi(D3)^2 - \pi(D2)^2 = \pi(D1)^2$, where
D1 refers to the first maximum outer width D2 refers to the second maximum outer width, and
D3 refers to the third maximum outer width.

7. A fluid flow control structure for a bicycle device comprising:
a main body that includes a first tube having a first chamber, a second chamber and a third chamber located within the first tube, and further includes a blocking member disposed in the first tube and dividing the first tube into the first chamber and a fourth chamber;
at least one port in fluid communication with the first chamber; and
a plug being moved toward a first axial direction to close the port and being moved toward a second axial direction that is opposite the first axial direction to open the port,
the plug including a dividing portion dividing the second chamber and the third chamber such that the third chamber expands as the plug moves to close the port and the third chamber shrinks as the plug moves to open the port, and a passage fluidly connecting the first chamber to the third chamber,
the blocking member including the port that fluidly connects the first and fourth chambers.

8. The fluid flow control structure according to claim 7, further comprising
a second tube being telescopically connected to the first tube.

9. The fluid flow control structure according to claim 8, further comprising
an actuating device mounted to the second tube, the actuating device being operatively coupled to the plug to selectively move the plug.

10. The fluid flow control structure according to claim 9, further comprising
a floating piston disposed in a portion of the first tube and forming a fifth chamber disposed between the floating piston and a first end of the first tube, and the first chamber being disposed between the floating piston and the blocking member.

11. The fluid flow control structure according to claim 10, wherein
the first end of the first tube includes an air filler valve port.

12. The fluid flow control structure according to claim 11, wherein
the first end of the first tube further includes a saddle attachment portion.

13. The fluid flow control structure according to claim 9, wherein
the actuating device includes an electric motor.

* * * * *